United States Patent [19]

Bozon et al.

[11] 4,363,753

[45] Dec. 14, 1982

[54] MECHANICALLY STABLE SCREEN CLOTH CONSTRUCTION MADE OF METAL

[75] Inventors: Alfred Bozon, Erlensee; Edgar Koberstein, Alzenau; Hans-Dieter Pletka, Freigericht; Herbert Voelker, Hanau, all of Fed. Rep. of Germany

[73] Assignee: Degussa Aktiengesellschaft, Frankfurt, Fed. Rep. of Germany

[21] Appl. No.: 187,871

[22] Filed: Sep. 17, 1980

[30] Foreign Application Priority Data

Sep. 19, 1979 [DE] Fed. Rep. of Germany ....... 2937757

[51] Int. Cl.³ .............................................. B01J 35/02
[52] U.S. Cl. ................................ 252/477 R; 428/256; 423/213.5
[58] Field of Search ...................... 252/477 R; 55/521; 422/180; 423/213.2, 213.5; 428/256

[56] References Cited

U.S. PATENT DOCUMENTS

| | | | |
|---|---|---|---|
| 3,920,583 | 11/1975 | Pugh | 252/465 |
| 3,966,646 | 6/1976 | Noakes et al. | 252/477 R |
| 4,162,993 | 7/1979 | Retallick | 252/477 R |
| 4,225,561 | 9/1980 | Torres | 422/180 X |

*Primary Examiner*—W. J. Shine
*Attorney, Agent, or Firm*—Beveridge, DeGrandi & Kline

[57] ABSTRACT

A mechanically stable screen cloth construction is disclosed which is suitable for a catalyst support.

11 Claims, 6 Drawing Figures

U.S. Patent Dec. 14, 1982 Sheet 2 of 2 4,363,753
FIG. 3
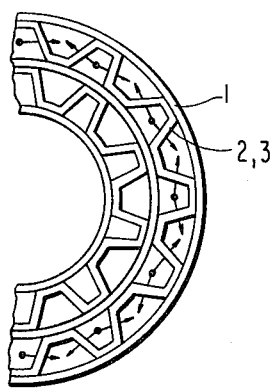
FIG. 3a
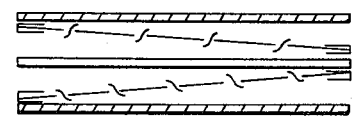
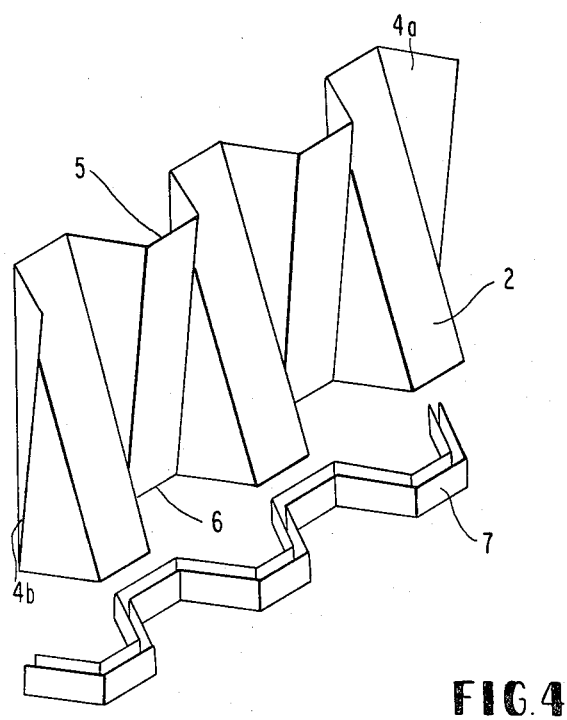
FIG. 4

MECHANICALLY STABLE SCREEN CLOTH CONSTRUCTION MADE OF METAL

INTRODUCTION AND BACKGROUND

The invention relates to a mechanically stable screen cloth construction made of metal.

The use of metal elements as structural reinforcers for catalysts for the purification of automobile exhaust gases is known. Thus in a series of publications (U.S. Pat. No. 3,920,583, German OS No. 23 02 746, German OS No. 24 50 644) a catalyst matrix of non-scaling steel has been described, which consists of an extended metallic carrier, in the case of which steel sheets of a certain thickness are developed as plain planar and, corrugated sheets, and are arranged alternatingly in layers.

In the German AS No. 21 64 123 a catalyst material in the form of one or more layers of a coated screen with variable dimensions and mesh width and in the form of coated mats, made of crinkled wire, had been described. The use of wire mesh compared to carriers fabricated of metal ribbons has the advantage of a lower weight and a higher geometric surface.

Furthermore, carrier matrixes for catalysts have already been described which consist of layers arranged one on top of the other, of high temperature resistant and non-scaling steel, whereby the layers consist of planar screen cloth into which spacers of a larger cross section than the screening have been woven on or in at parallel distances in the direction of the desired flow channels, or whereby layers of planar screen cloth or corrugated sheet metal alternate with layers of planar or corrugated screen cloth.

Another advantage of such gas permeable matrixes as compared to systems made of metal ribbons, is a cross stream effect promoting the catalysis and an improved supporting capacity relative to catalysis promoting metal oxides present in an immersion dispersion. Known systems made of wire mesh, however, should be improved in their stability as in regard to mechanical deformation.

In the case of modern internal combustion engines, the requirements for mechanical stability are indeed extraordinarily high. As a result of the ignition sequence of a piston engine, catalysts as well as lead or carbon particle filters or condensate filters are admitted with the exhaust gases, which are characterized by strong pulsations. The latter, in the case of known matrix systems, may soon lead to the mechanical destruction of the catalyst support or of the exhaust gas particle filter.

SUMMARY OF THE INVENTION

The invention relates to a mechanically stable screen cloth construction made of metal, which may be used as a highly effective filter and/or as a catalyst carrier with a flow pattern that is favorable for the conversion of the exhaust gas.

The screen cloth construction is characterized by the fact that it consists alternatingly of a layer of corrugated or folded screen cloth and of a planar closed or perforated cover layer, whereby a U-shaped border element attached to its profile edge is fitted over the corrugated or folded layer, at two of its opposite edges standing perpendicularly in relation to the corrugation or the folding, and is fixedly attached to it.

At the same time the planar cover layer may be a smooth sheet metal or a metallic screen cloth with an U-shaped edge border element fitted over it.

The layers may be stacked into a package or may be wound up into a cylindrical, oval, rectangular or multi-cornered spiral.

In order to rigidify the screen construction, it has proven to be a favorable expedient to weld or to solder the border elements together with the layers in a spot weld manner or roller seam manner, whereby one packing or coiling may be welded or soldered together on the front side.

An improvement of the filter development may also be achieved by making the cloth weave more dense. For this purpose, several layers of screen cloth are taken together as one layer and are clamped in at the edge with a metal foil prior to deforming and are fixed by welding or soldering.

In the case of a further improvement of the invention one may also use one or more layers of a planar filter screen cloth instead of the cover metal sheet, which, prior to the deforming, is likewise clamped in with a metal foil and are fixed together by welding or soldering with the filter screening.

Accordingly, a preferred embodiment of the invention resides in providing several layers of screen cloth arranged one to top of the other and held together by a single border element at their edges.

Within the scope of the invention is a screen construction of an alternatingly corrugated or folded layer of metal sheet and a planar cloth may be provided, whereby the U-shaped border element is needed only for the planar screen cloth. Thus a considerably saving in weight with good mechanical stability may be achieved, which however, is less than in the case of the use of a corrugated or folded screen.

The screen cloth used may represent a web with a mesh width of 0.18–0.025, preferably 0.1–0.05, especially 0.073 mm and with a wire gauge of 0.15–0.025, preferably 0.1–0.05, especially 0.07 mm.

As cover metal sheets or metal foils for the edging of the filter screen one uses metal ribbons with a wall thickness less than 0.15 mm.

Width and height of the cells enclosed by the alternatingly arranged planar and corrugated or folded layers should not be any smaller than 0.2 mm.

The corrugated layer may be in various shapes. It is desirable, for it to have the shape of a sine curve or the shape of an involute or a rectangle or a square.

A particularly effective development of the screen construction according to the invention resides in conducting the exhaust gas stream in a longitudinal and transverse flow relative to the direction of the exhaust gas stream and thereby help to force it through the layers of the filter screen cloth. In this case the folded layer, has a profile, at the edges which are perpendicular relative to the fold, projecting alternately to the inside and to the outside in the form of a trapezoid shape open at its base line, whereby a trapezoid pointing inwards is always connected at one edge by a slanting surface with a trapezoid at the opposite edge, pointing outwards.

For the screen arrangement according to the invention, sheet metals and screen cloth are particularly favorable, which consist of an alloy of iron, chromium, aluminum and optionally cerium or yttrium and the customary alloy-accompanying elements, or of other heat resistant high temperature and non-scaling material.

According to the invention large filter or catalyst surfaces with very low loss in pressure may be produced with considerably improved stability. The object of the invention is suitable as a reinforced support for catalysts for the elimination of harmful substances from the exhaust gases of internal combustion engines and as a filter for finely distributed solid substances contained in exhaust gas and for droplets of condensate. It is particularly suitable for the mechanical and/or catalystic purification of exhaust gases from Diesel engines. This double function may be summarized under the concept of "Filter Catalyst."

Consequently, another object of the invention resides in the use of the disclosed screen cloth construction in purification installations for exhaust gas of interal combustion engines, as filters for dust and/or aerosols, and-/or as carrier matrix for catalysts.

The screen cloth construction according to the invention may be covered according customary processes, for example by electroplating or impregnating directly with noble metal or with non-noble metal. They may, however, also be processed into a carrier matrix, impregnated with solutions of active catalyst metal and coated with a customary carrier material for catalysts. At the same time, the individual layers are coated at their surface with a catalysis-promoting carrier material, mostly a metal oxide of a high surface area such as active $Al_1O_3$. As catalysis promoting additions one may also use the elements Ce, Zr, Fe, Ni, rare earths or a combination of these. The intermediate layer of carrier material is then provided with the actual catalyst according to customary known methods.

The invention will be explained in more detail in the following paragraphs, on the basis of the above mentioned particularly effective embodiment which is shown in the drawings.

DESCRIPTION OF DRAWINGS

FIG. 3 is a cross sectional view cut through the wound-up screen cloth construction transverse to the direction of flow of the exhaust gas, as well as its arrangement between the cover layers, designating the front side welding points (FIG. 3a); and FIG. 4 is an enlarged view of a folded screen cloth construction with accompanying border element.

DETAILED DESCRIPTION OF INVENTION

Figure 1:
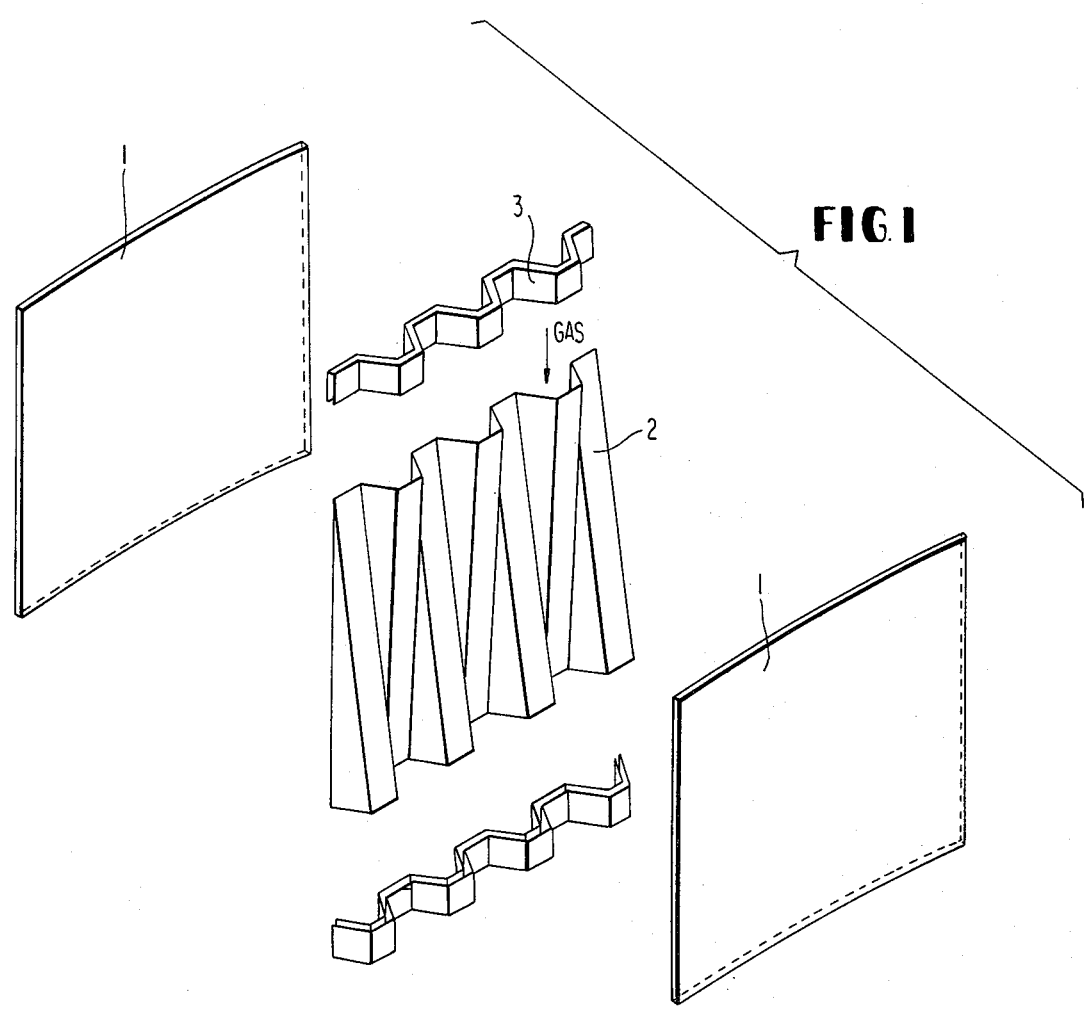
FIG. 1 is an exploded view of the individual components of the screen cloth construction.
Figure 2:
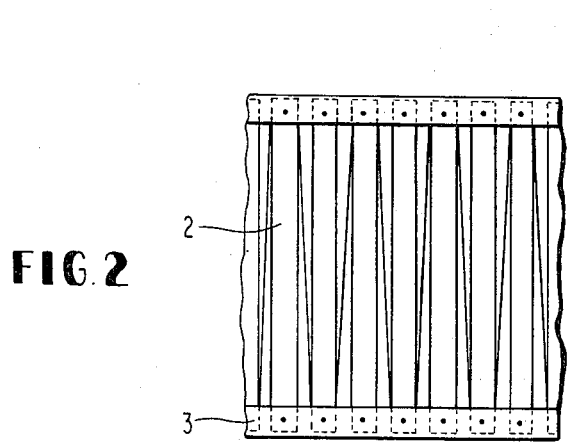
FIG. 2 is a side view of a screen cloth layer with designation of the welding or solder points between the border edge element and the screen cloth layers as well as their arrangement between the two cover layers with schematic representation of the course of flow of the exhaust gas (FIG. 2a)
Figure 2A:
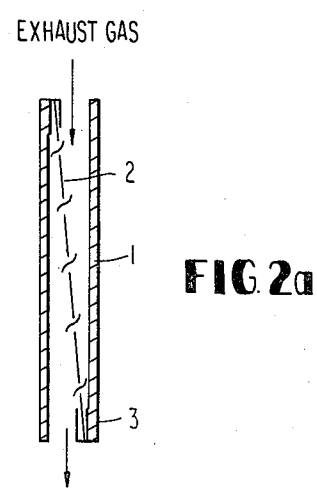

As will be evident from FIG. 1, this embodiment of the screen construction according to the invention, consists alternately of one layer of planar sheet metal cover 1 and a layer of folded screen cloth 2, which is deformed in such a way that upon winding up the alternate layers into a cylinder, the exhaust gas is forced to pass through the screen and in that way it is filtered and/or catalytically treated. The exhaust gas at the same time, comes into contact with a larger surface area than would be the case upon passing through unimpeded parallel flow channels. In order to strengthen the filter screen cloth the latter is edged at its upper and lower edge prior to the deforming with a metal foil 3, and—as FIG. 2 shows—it had been firmly clamped together with the filter screen cloth by point welding or by welding of a roller seam or by soldering together with the filter screen. FIG. 2a shows the forced path of flow of the exhaust gas.

In order to increase the overall stability of the screen cloth construction wound up into a cylinder, and as FIGS. 3, and 3a show, the sheet metal covers 1 with the edged filter screen cloth 2, 3 are firmly connected at the front surfaces by resistance or electron beam welding or by soldering firmly one with the other.

As shown in FIG. 4, the folded screen cloth layer 2 at the edges 4a, 4b which are perpendicular relative to the folds, has a profile in the form of a trapezoid open at its base line and projecting alternate to the inside and the outside, whereby one trapezoid 5 always points inwards, i.e. to the middle axis of the exhaust gas, flow direction, is connected with one edge 4a with a trapezoid 6 pointed outwards on the opposite edge 4b. Position 7 shows the U-shaped edge for the layer of the screen.

Further embodiments and variations of the invention will be apparent to those skilled in the art upon a reading of the foregoing and are intended to be encompassed by the claims appended hereto.

We claim:

1. A mechanically stable screen cloth construction made of metal comprising at least one layer of corrugated or folded screen cloth and at least one planar closed or perforated cover layer, and a U-shaped border element fitted to the profile edge of and positioned over said corrugated or folded layer on two of its opposite edges which edges are perpendicular in relation to the axis of corrugation or folding, said screen cloth layer and said cover layer being arranged in alternate layers.

2. A screen cloth construction as defined in claim 1 wherein the planar cover layer is a planar sheet metal or a metallic screen with a U-shaped marginal border element positioned over and along at least one edge thereof.

3. A screen cloth construction as defined in claim 1 or 2, wherein the layers are stacked into a package or are wound up into a cylindrical, or oval, rectangular or multi-cornered spiral.

4. A screen cloth construction as defined in claim 1 or 2, wherein the border element is welded or soldered in a spot weld or rolled seam manner with said layers.

5. A screen cloth construction as in claim 1 or 2, wherein the layers are stacked into a package or are wound up into a winding and the package or winding is welded together or soldered together on the front side thereof.

6. A screen cloth construction as defined in claim 1 or 2, wherein several layers of screen disposed one on top of the other, are clamped at their respective edges by a single border element.

7. A screen cloth construction as defined in claim 1 or 2, wherein the corrugated layer has a sine curve shape, or an involute, rectangular or square shape.

8. A screen cloth construction as defined in claim 1 or 2, wherein the folded layer on its edge which is perpendicular to the folding, has a profile projecting alternatingly to the inside and the outside in the form of a trapezoid open on its base line, whereby a trapezoid always pointing inwards is connected at the edges by suitable surfaces with a trapezoid on the opposite edge and pointing outwards.

9. A support for a noble metal catalyst for the purification of automobile exhaust gases comprising the screen cloth construction of claim 1.

10. A support as defined in claim 9, wherein said screen cloth has deposited thereon a catalytically active high surface area metal oxide coating as an intermediate coating.

11. A catalyst for the purification of exhaust gases comprising a catalytically active metal deposited on a support therefor, said support comprising the screen cloth construction of claim 1.

* * * * *